Patented Nov. 28, 1950

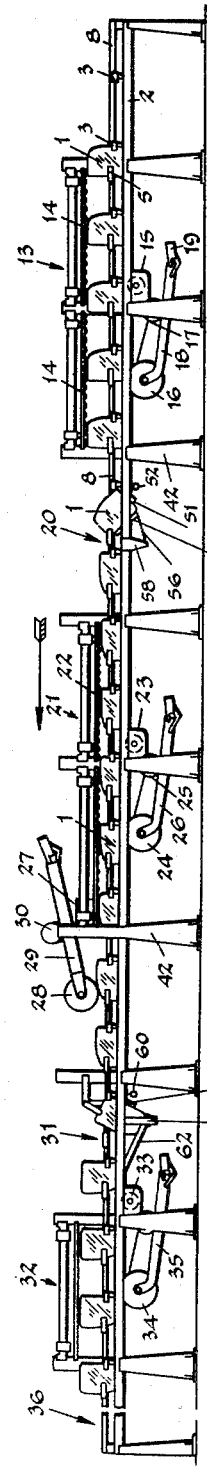
Nov. 28, 1950 — E. C. OBERSTAR — 2,531,640
APPARATUS FOR TURNING GLASS SHEETS
Filed Dec. 26, 1947 — 3 Sheets-Sheet 1
INVENTOR.
Edward Oberstar
BY Nobbe & Swope
ATTORNEYS

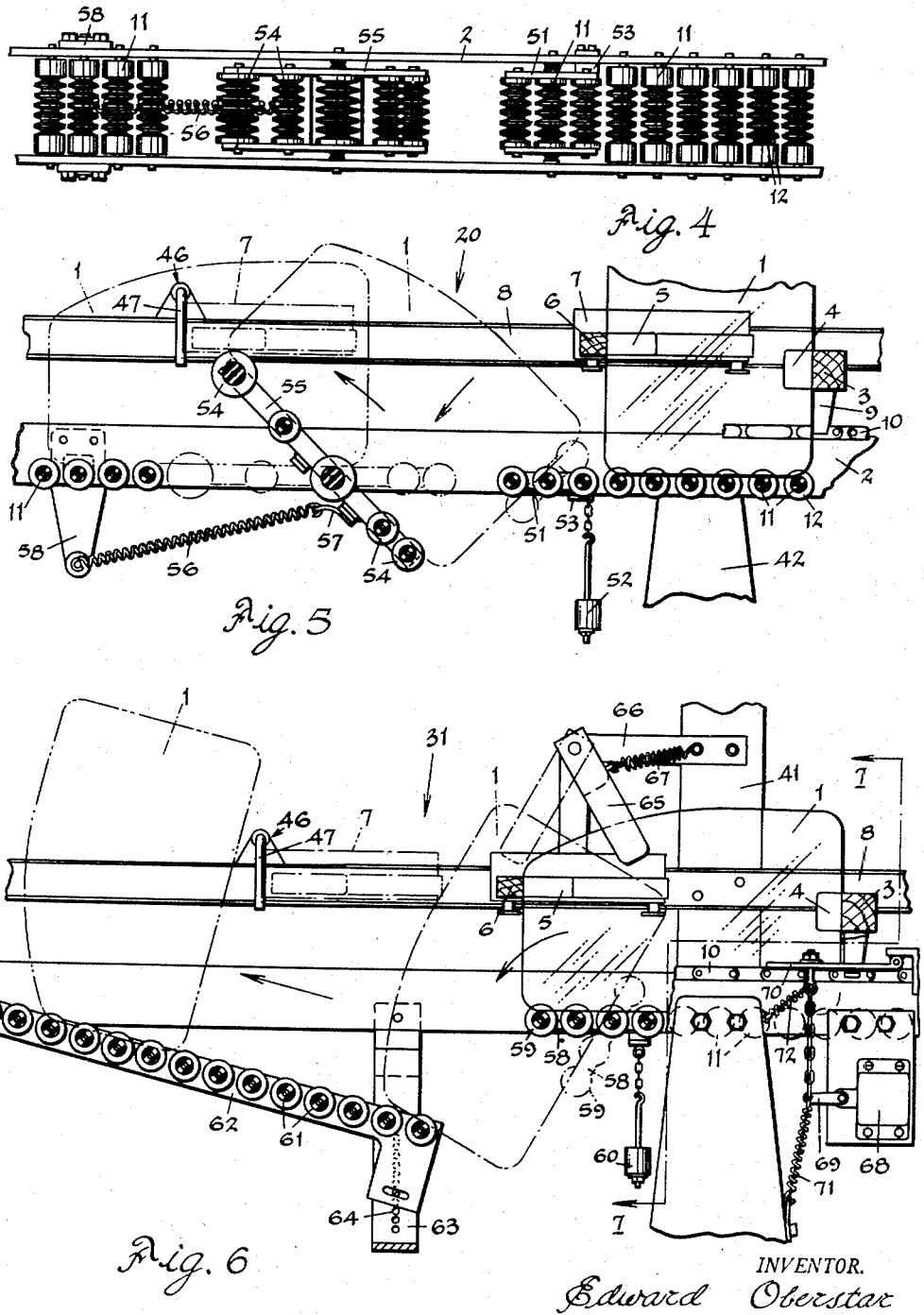

2,531,640

UNITED STATES PATENT OFFICE 2,531,640

APPARATUS FOR TURNING GLASS SHEETS

Edward C. Oberstar, Ottawa, Ill., assignor to Libbey-Owens-Ford Glass Company, Toledo, Ohio, a corporation of Ohio Application December 26, 1947, Serial No. 794,021

10 Claims. (Cl. 198—33)

This invention relates to glass handling apparatus and in particular to an apparatus for rotating glass sheets so as to successively present the various edges to grinding wheels as the sheets are carried along a runway.

Apparatus for removing the excess plastic film from the edges of laminated safety glass and for subsequently grinding the edges of the glass to remove the sharp corners is known and in use. In such an apparatus it is necessary to rotate the glass sheets as they are carried forward in an upright position so as to present each of the edges to the grinding wheels. It has been customary practice to employ manual or power driven apparatus to effect such rotation.

The principal object of this invention is to provide a simplified method and mechanism for turning the glass sheets as they progress from one grinding station to the next.

Another object of the invention is to provide rockable frames carrying portions of the runway which frames rock as the glass sheets pass over them and thereby produce the forward tipping motion required to effect the turning of the sheets.

A still further object of the invention is to provide guiding combs that serve to maintain the glass sheets in upright position as they are carried along the runway and as they are tipped forwardly to effect the desired turnover.

A still further object is to provide a pivotally mounted comb that is yieldably held in its normal position and that serves to guide the glass sheets during a turning operation when the glass sheets may be otherwise free from lateral support.

These and more specific objects and advantages are apparent from the following description in which reference is made to the accompanying drawings.

According to the invention, the turning operation is accomplished by providing a gap in an otherwise continuous runway and pushing the glass sheets toward the gap so that they tip forwardly as they enter the gap. Means are provided to catch the glass sheets along their formerly forward edges, now their bottom edges, and support them in such position until the pushing means engages their formerly bottom edges, now rear edges, to drive them onward along the runway.

Preferred forms of the invention are illustrated in the accompanying drawings, in which:

Figure 1 is a side elevation at reduced scale of an apparatus for edge grinding glass sheets in which a turning mechanism incorporating the invention is employed to rotate the glass sheets forwardly intermediate some of the grinding operations.

Figure 2 is an enlarged fragmentary detail showing the pushing means for driving the glass sheets along the runway and a driven guiding comb that provides lateral support for the sheets as they progress along the runway.

Figure 3 is a fragmentary transverse section showing the arrangement of the runway, the chain driven pushers, and the guide combs as viewed in the direction of travel of the glass sheets.

Figure 4 is a plan view of the runway at the first turning station.

Figure 5 is a vertical longitudinal section of the first turning station.

Figure 6 is an elevation, partly in section, of a modified structure for turning the glass sheets, which structure is employed at the second turning station.

Figure 7:
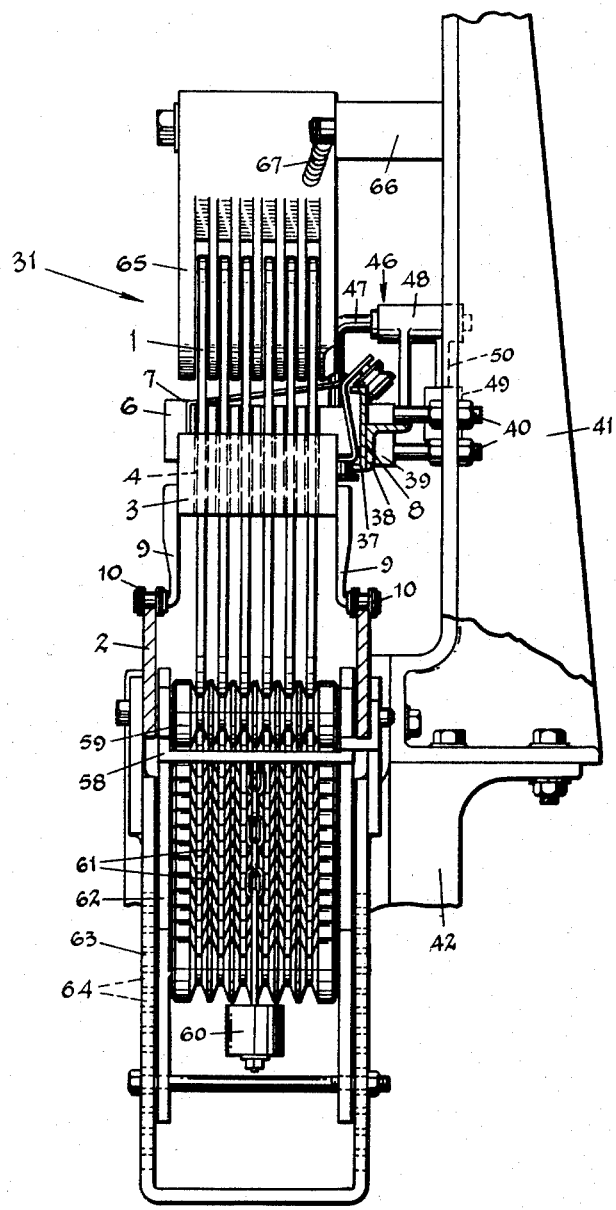
Figure 7 is a transverse section taken substantially along the broken line 7—7 of Figure 6.

These specific figures and the accompanying description are intended merely to illustrate the invention but not to impose limitations on the claims.

Referring now to Figure 1, glass sheets 1, the edges of which are to be ground, are supported in upright position on a runway 2 extending throughout the length of the machine. Each group of glass sheets 1 is driven along the runway by a pusher block 3, the forward face of which is grooved to provide teeth 4 that hold the glass sheets in spaced-apart relation. The forward edges of the glass sheets 1 are held in spaced relation by teeth 5 of a guide comb 6 mounted on a carriage 7 that is driven along a rail 8 by force transmitted through the glass sheets 1 from the pusher block 3. The pusher block 3 is carried on arms 9 extending upwardly from links of chains 10 that run along the sides of the runway 2. The glass-contacting portion of the runway 2 comprises a plurality of rubber rollers 11 having grooves 12 in which the lower edges of the glass sheets 1 are supported and guided. The teeth 4 of the pusher block 3 and the teeth 5 of the guide comb 6 have the same spacing as the grooves 12 of the rubber rollers 11 so that the glass sheet or sheets are held in an upright or vertical position and are spaced apart according to the spacing of the grooves 12. The glass sheets 1 may be processed singly or in groups, with the maximum number of sheets in a group limited by the number of grooves 12 in the rollers 11.

As the glass sheets 1 progress through a first grinding station 13 they are held firmly in contact with the rubber rollers 11 by a plurality of yieldably mounted rollers 14 that bear against the upper edges of the glass sheets. The glass sheets 1, which may be sheets of "safety" glass consisting of two sheets of glass bonded together by a plastic interlay, first pass a motor driven wire brush 15 that removes the excess plastic film protruding from the lower edges of the glass sheets. After being brushed the lower edges of the glass sheets 1 are presented to a grooved grinding wheel 16 that is driven by a motor 17. The grinding wheel 16 and motor 17 are mounted on a pivoted arm 18 that has sufficient counterweights 19 to cause the grinding wheel 16 to bear upwardly against the lower edges of the glass sheets. A sufficient number of the rubber rollers 11 are removed from the space immediately above the grinding wheel 16 so that in the absence of glass sheets the wheel 16 rises above the level of the runway 2 and is thus in position to follow down and around the curved corners of the glass sheets as they progress along the runway 2.

After the glass sheets 1 pass the grinding wheel 16, their then bottom or lower edges are finished and it is necessary to turn the sheets forward through a 90° angle so that the formerly vertical leading edges become the lower edges. This turnover is accomplished in a turning station that will be described in detail later. From the turning station 20 the glass sheets 1 enter a second grinding station 21 where they are again firmly held against the rubber rollers 11 of the runway 2 by a plurality of yieldably mounted rollers 22 that bear against the now upward edges of the glass sheets. In this grinding station the glass sheets 1 are first passed over a motor driven wire brush 23 and then past a grooved grinding wheel 24 that is similar in all respects to the grinding wheel 16. The grinding wheel 24 is driven by a motor 25 and is supported on a counterbalanced pivoted arm 26.

As the glass sheets 1 leave the grinding wheel 24 they pass beneath a third motor driven wire brush 27 that follows along their upper edges. A short time later they pass beneath a third grooved grinding wheel 28 that is mounted on the end of a counterbalanced arm 29 and that is driven by a motor 30. The arm 29 is counterbalanced so that the grinding wheel 28 tends to drop and is thus conditioned to bear on and follow along the upper edges of the glass sheets as they are driven along the runway 2 beneath the grinding wheel 28.

As the glass sheets 1 leave the grinding wheel 28 they enter a second turning station 31 where they are tipped forward through an angle of 90° so that their formerly leading edges become their bottom edges. In this position the sheets enter a last grinding station 32 where they first pass over a motor driven wire brush 33 and then a grooved grinding wheel 34 that is motor driven and that is mounted on the end of a counterbalanced arm 35. The grinding wheel 34 finishes the last side of the glass sheets and they are then carried onwardly to an unloading station 36 where they are removed from the runway.

Referring now to Figures 2 and 3, the rail 8 along which the carriages 7 travel consists of a shallow channel iron 37 that is reinforced by an angle iron 38 welded to its flat side. The rail 8 is supported on brackets 39 that include bolts 40 attached to an upright frame member 41. The frame member 41 is one of a series of supports erected from the upper ends of a series of pedestals 42 that support the runway 2. The channel iron 37 extends parallel to the path followed by the glass sheets traveling along the runway 2 and is oriented so that its open side faces forwardly toward the glass.

Each carriage 7 is provided with grooved rollers 43 that engage the upper horizontal and the rear vertical surfaces of the channel iron 37. Other rollers 44 are journaled on the carriage 7 in position to engage the lower forwardly extending flange of the channel iron 37. The rollers 43 and 44 serve to rigidly support the carriage 7 against any motion except translation along the rail 8. The arrangement of the rollers 43 and 44 is such that the carriages 7 may be easily disengaged from the rail 8 by merely lifting them upwardly and away from the rail. They are just as easily engaged with the rail 8 because a rear frame member 45 of each of the carriages 7 is shaped so that when it is pushed against the upper forwardly extending flange of the channel iron 37 and allowed to slide downwardly in contact with the flange it guides the carriage 7 into position so that the rollers 43 and 44 may accurately engage the channel iron 37.

A gravity operated carriage retarder 46 is installed at each of the turnover stations 20 and 31. The retarder 46 includes a downwardly directed pivoted arm 47 a horizontal portion of which is journaled in a bracket 48 extending upwardly from the rail 8. The arm 47 is yieldably held in position to engage the carriages 7 to prevent them from running away from glass sheets that they are intended to guide. In the example shown the retarder arm 47 is held in position by a pendulum weight 49 mounted on the end of an arm 50 extending downwardly from the horizontal portion of the pivoted arm 47. Resilient means could also be employed to yieldably hold the pivoted arm 47 in carriage engaging position but a pendulum weight such as the weight 49 is preferred because the mass of the pendulum weight tends to absorb the shock and decelerate the carriage 7 more rapidly than a spring. Furthermore, the pendulum weight, for equal stopping power, presents far less opposition to slow forward motion of the carriages 7.

Referring now to Figures 4 and 5, which show in plan and elevation the first turning station 20, a glass sheet 1 (representative of a group of one or more sheets) is shown approaching a gap in the runway 2 and as it approaches it is guided by the teeth 5 of the comb 6 of the carriage 7 and the teeth 4 of the pusher 3. As long as the sheet 1 rests on the rollers 11 it travels along without any tendency to tip forward or back. As it advances it finally rests on a series of three of the rollers 11 that are mounted in a rockable frame 51 which is free to rock about the axis of the middle one of the three rollers. The rockable frame 51 is urged toward alignment with the runway 2 by means of a weight 52 suspended from one end of the frame 51. The weight 52 pulls the frame 51 against a stop 53 positioned so that the grooves of the rockably mounted rollers form a continuation of the track or runway formed by the other rollers of the runway. As the center of gravity of the glass sheet 1 passes over the middle one of the rockably mounted rollers, the rockable frame 51 tilts thereby tipping the glass sheet 1 forwardly and away from the pusher 3.

As the glass sheet falls forwardly it is caught along its formerly forward or leading edge by a series of rollers 54 that are mounted in a rockable frame 55 pivoted about the axis of one of the rollers and resiliently held in inclined position by a coiled tension spring 56 that is connected between a tab 57 attached to the rockable frame 55 and a bracket 58 depending from the side of the runway 2. As the formerly leading edge of the glass sheet 1 is caught on the rollers 54 of the inclined frame 55 the inertia of the glass causes the frame 55 to rock toward alignment with the runway 2 so that the formerly lower edge of the glass, which had been carried in the grooves of the rollers 11 on the runway, is brought into position to be engaged by the pusher 3.

As the glass falls forwardly in passing the rockable frame 51 it tends to accelerate the carriage 7 thus driving the carriage forwardly far enough to clear the upper forward corner of the glass sheet as it falls. The carriage retarder 46 is located to catch the carriage as soon as it has advanced far enough to permit the tipping movement of the glass sheet. This forward travel is not sufficient to completely disengage the glass sheets from the spaces between the teeth 5 of the comb 6 so that throughout its turning movement the glass sheet is laterally supported. As soon as the pusher 3 engages the formerly lower edge, the now rear edge, of the glass sheet it drives the sheet forwardly so that the formerly upper edge, the now forward edge, is fully engaged in the comb 6 and the carriage 7 is driven past the arresting or retarding member 46 and the glass sheet proceeds into the second grinding station 21.

After the glass has passed through the second grinding station in which its now lower and upper edges are ground it proceeds to the second turning station 31. The mechanism of this turning station is illustrated in Figure 6. As the glass sheet 1 progresses into the second turning station 31 it tips forwardly as its center of gravity passes the pivoting point of a rockably mounted frame 58 carrying a series of grooved rollers 59. The frame 58 is yieldably held in alignment with the runway 2 by a weight 60 that is suspended from one of its ends and which tends to pull that end against a stop for defining its aligned position.

As the glass sheet falls forwardly with the tipping of the rockable frame 58 it is caught along its formerly forward edge on a series of grooved rollers 61 mounted in an inclined frame 62. The lower end of the inclined frame 62 is supported from a U-shaped bracket 63 depending from the sides of the runway 2. The sides of the bracket 63 are provided with series of holes 64 so that the inclination of the inclined frame 62 may be easily adjusted. As the glass sheet 1 is caught on the rollers 61 the pusher 3 engages its now rearward edge to drive it forwardly up the incline 62 and back onto the runway 2.

The glass enters this station supported on one of its longer sides and as a result the carriage 7 is so far in advance of the turning glass sheet that the glass leaves the space between the teeth 5 and, therefore, loses the benefit of their lateral support. To avoid any lateral derangement of the glass during this turning operation a pivoted comb 65 is mounted from a frame 66 extending from one of the uprights 41 in position so that its teeth provide lateral support for the glass sheet as it falls clear of the comb 6 of the carriage 7. The comb 65 is urged toward the oncoming glass sheet 1 by a spring 67 which yields to permit the comb to follow the sheets or swing free if a glass sheet fails to enter the space between the comb teeth.

At this station, as in the preceding station, the carriages 7 are stopped by the retarder 46 so that there is a minimum of time during which the glass sheet is free from lateral support.

To avoid any possibility of serious damage in the event that the glass sheet should jam, a series of stop switches 68 are provided as necessary along the length of the runway 2. These stop switches 68 each have an arm 69 that is connected to a follower 70 that rides the upper surface of the driving chains 10. The follower 70 and the arm 69 are resiliently held in their normal positions by a helical tension spring 71 while some additional force is applied to the follower 70 by a second spring 72. In the event that the glass sheet 1 encounters unusual resistance to forward motion, the pusher 3 is tipped rearwardly thus raising the chain 10 and the follower 70 to actuate the stop switch 68.

Figure 7 (a view looking along the runway 2 toward the second turning station 31) shows the glass sheets 1 as they approach the gap in the runway at the turning station. As seen here they are entering the comb 65 which provides lateral support as they fall free from the carriage 7.

The improved turning mechanisms illustrated in Figures 4 to 7 inclusive are extremely simple in operation in that they depend upon a combination of gravity and the regular conveying mechanism to effect a 90° forward rotation of the sheets at selected points along their path of travel. The rockable frames 51 and 58 are included merely to provide support against twisting while the sheets are tipping forwardly. Except for the twisting the operation of tipping the sheets forward is just as readily accomplished if the rockable feature is eliminated and the sheets are tipped over the last one of the rollers preceding the gap.

Various modifications of the guiding structure shown may be made and still employ the improved method of turning glass sheets in which the glass sheets are allowed to tip forwardly into a gap in the runway along which they travel and in which they are caught along their formerly forward edges in position so that a pushing mechanism may engage their formerly bottom edges and thus drive them forwardly in their turned position.

Having described the invention, I claim:

1. In a device of the class described, in combination, a runway along which an uprightly supported glass sheet may travel, means for pushing the glass sheet along the runway, said runway having a gap into which the sheet falls forwardly as it passes thereabove along the runway, and means positioned to catch the falling sheet along its formerly forward edge and to support it in position to be engaged and driven forward along the runway by engagement between the pushing means and the formerly bottom edge of the glass sheet.

2. In a device of the class described, in combination, a runway including grooved rollers on which an uprightly supported glass sheet may travel with its lower edge guided in the grooves, means for pushing the glass sheet along the runway, said runway having a gap into which the glass sheet falls forwardly as it moves over the last roller before the gap, and a plurality of grooved rollers located in position to catch the falling glass sheet along its formerly forward edge and support it in position to be engaged and driven forward along the runway by engagement between the pushing means and the formerly lower edge of the glass sheet.

3. In a device of the class described, in combination, a runway including grooved rollers on which an uprightly positioned glass sheet may travel with its lower edge guided in the grooves, said runway having a gap into which the glass sheet will fall forwardly as it moves thereabove along the runway, a grooved member mounted to travel above said runway and over said gap contributing to the lateral support of the glass sheet and serving to push it along the runway, and means positioned to catch the glass sheet along its formerly forward edge when it falls into said gap and to support the fallen sheet with its formerly lower edge in position to be engaged by the grooved pushing member.

4. In a device of the class described, in combination, a runway including grooved rollers on which an uprightly positioned glass sheet may travel with its lower edge guided in the grooves, a grooved pusher member contributing to the lateral support of the glass and serving to push the glass along the runway, a rockable frame carrying some of the grooved rollers of the runway, said frame being mounted to rock by gravity as the glass sheet passes over it to tip the sheet forwardly, and means for catching the tipped sheet along its formerly forward edge and supporting it in position for its formerly lower edge to be engaged by the pusher member.

5. In a device of the class described, in combination, a runway including rollers on which an uprightly supported glass sheet may travel, a pusher member for driving the glass sheet along the runway, said runway having a gap, a rockable frame carrying some of the rollers of the runway immediately preceding the gap and mounted to rock by gravity as the glass sheet passes thereover, yieldable means for normally holding the frame in alignment with the runway but permitting it to rock and tip the glass forwardly, and means for catching the glass along its formerly forward edge and supporting it in position for its formerly lower edge to be engaged by the pusher member.

6. In a device of the class described, in combination, a runway including rollers on which an uprightly supported glass sheet may travel, a pusher member for driving the glass sheet along the runway, a pair of rockable frames carrying some of the rollers of the runway, the first of said frames being mounted to rock by gravity as the glass sheet passes thereover to tip said sheet forwardly, yieldable means for holding the first of the rockable frames in alignment with the runway and permitting it to rock to tip the glass sheet forwardly as the sheet passes the frame, yieldable means for holding the second rockable frame in inclined position to catch the glass along its formerly forward edge, said second rockable frame serving to support the glass sheet and by rocking into alignment with the runway under the weight of the moving glass sheet to guide the glass sheet onto the runway as the pusher engages the formerly lower edge of the glass sheet.

7. In a device of the class described, in combination, a runway including rollers on which an uprightly supported glass sheet may travel, a pusher member for driving the glass sheet along the runway, a rockable frame carrying some of the rollers of the runway and mounted to rock by gravity and tip the glass forward as it passes over the frame, and an inclined frame fitted with rollers for catching the glass as it falls forward and for supporting the glass with its formerly lower edge in position to be engaged by the pusher member.

8. In a device of the class described, in combination, a runway including rollers on which an uprightly supported sheet of glass may travel, a pusher for driving the glass along the runway, a rockably mounted frame carrying some of the rollers, said frame being mounted to rock by gravity as the sheet of glass passes over it to tip the sheet forwardly, and a frame inclined downwardly from said runway and carrying rollers positioned to catch the tipped glass sheet along its formerly forward edge and support the glass so its formerly lower edge may be engaged by the pusher.

9. In a device of the class described, in combination, a runway including rollers on which an uprightly supported sheet of glass may travel, a pusher for driving the glass along the runway, a rockably mounted frame carrying some of the rollers, said frame being mounted to rock by gravity as the sheet of glass passes over it to tip the sheet forwardly, an inclined frame carrying rollers positioned to catch the glass sheet along its formerly forward edge and support the glass so its formerly lower edge may be engaged by the pusher, a comb positioned above the rockable frame and having downwardly directed teeth forming a guide for maintaining the glass sheet in alignment as it tips forward, and yieldable means for holding the comb in position.

10. In a device of the class described, in combination, a runway including rollers on which an uprightly positioned glass sheet may travel, a rail extending parallel to the runway, a carriage mounted on the rail for movement therealong, a power driven pusher for driving the glass sheet along the runway, guide means on the carriage and the pusher for engaging the glass sheet to provide lateral support therefor, said runway having a gap into which the glass sheet may fall forwardly, means for catching the glass sheet along its formerly forward edge, and restraining means adjacent the rail and near the gap for arresting the carriage after the sheet falls forwardly and until its formerly upper edge engages the guide means of the carriage.

EDWARD C. OBERSTAR.

REFERENCES CITED

The following references are of record in the file of this patent:

UNITED STATES PATENTS

| Number | Name | Date |
|---|---|---|
| 935,848 | Jenkins | Oct. 5, 1909 |
| 1,390,853 | Worth | Sept. 13, 1921 |
| 1,623,393 | Dicely | Apr. 5, 1927 |
| 1,687,985 | Mermer | Oct. 16, 1928 |
| 1,859,501 | Durbin | May 24, 1932 |
| 1,967,683 | Ostrander | July 24, 1934 |
| 2,341,128 | Titus et al. | Feb. 8, 1944 |